United States Patent
Yang (10) Patent No.: US 12,190,844 B2
(45) Date of Patent: Jan. 7, 2025

(54) AUTOMATIC WHITE BALANCING OF DISPLAY DEVICE TO MATCH USER-PREFERRED MODES

(71) Applicant: MOTOROLA MOBILITY LLC, Wilmington, DE (US)

(72) Inventor: Jie Yang, Suizhou (CN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/685,343

(22) Filed: Mar. 2, 2022

(65) Prior Publication Data

US 2023/0282178 A1    Sep. 7, 2023

(51) Int. Cl.
*G09G 5/00* (2006.01)
*G06V 20/40* (2022.01)

(52) U.S. Cl.
CPC .............. *G09G 5/003* (2013.01); *G06V 20/41* (2022.01); *G09G 2320/0606* (2013.01); *G09G 2320/062* (2013.01); *G09G 2320/0626* (2013.01); *G09G 2320/0666* (2013.01); *G09G 2320/08* (2013.01); *G09G 2354/00* (2013.01); *G09G 2360/141* (2013.01); *G09G 2360/144* (2013.01)

(58) Field of Classification Search
None
See application file for complete search history.

(56) References Cited

U.S. PATENT DOCUMENTS

| | | | |
|---|---|---|---|
| 2017/0263174 A1* | 9/2017 | Chen | G09G 5/02 |
| 2018/0302536 A1* | 10/2018 | Kaneko | G06T 7/11 |
| 2019/0266977 A1* | 8/2019 | Ward | G09G 3/3208 |

* cited by examiner

*Primary Examiner* — Andre L Matthews
(74) *Attorney, Agent, or Firm* — Isidore PLLC (57) ABSTRACT

An electronic device, method and computer program product enable an enhanced user experience by adjusting a white balance of a display device according to user preferences in combination with automatically adjusting luminance and chromaticity in response to ambient light conditions. The electronic device includes a color-sensitive ambient light sensor (ALS) and the display device. A controller of the electronic device measures luminance and chromaticity of ambient light using the ALS. The controller adjusts display brightness of the display device in relation to intensity of the luminance of the ambient light. The controller automatically determines a display target correlated color temperature (CCT) in relation to the chromaticity of the ambient light. The controller determines a display target white balance CCT adjusted in relation to user selection(s) related to white balance. The controller sets the display device to digitally map colors about a neutral color defined by the display target white balance.

17 Claims, 7 Drawing Sheets

FIG. 5C ively reproducing a particular color in the images and videos. Imperfect manufacturing process can lead to less than ideal display devices. Complex underlying physical mechanisms of the display device can degrade during the display's lifetime, leading to less than ideal display performance. Ambient lighting conditions vary in color and luminance, which causes rendering of images and video presented at the display device to appear inaccurate and to not have a subjectively preferred appearance for the person viewing the display device. White balance is the process of adjusting the presented colors so that objects which appear white in person are rendered white. White balance may also be intentionally shifted from a neutral point to create a color cast to the presented image or video (i.e., an unwanted color shift in the whole image caused by reflected light from a nearby object. The display white balance affects display image quality and video quality. Evidence shows that display white balance has a positive correlation to visual experience. Electronic devices to varying degrees may automate certain automatic white balance algorithms to adjust the white balance for changing conditions. However, users have preferred color tones, which are not the same as the ambient light correlated color temperature (CCT) that is used in known automated white balance adjustment algorithms.

AUTOMATIC WHITE BALANCING OF DISPLAY DEVICE TO MATCH USER-PREFERRED MODES

CLAIM TO FOREIGN PRIORITY

This application claims priority to Chinese Patent Application No. 202210085149.9, filed Jan. 25, 2022, the content of which is fully incorporated herein.

BACKGROUND

1. Technical Field

The present disclosure relates generally to electronic devices with a color display device, and more particularly to electronic devices having an ambient light sensor that is used in adjusting the color display device for ambient light conditions.

2. Description of the Related Art

Electronic devices such as mobile phones, laptops, and tablets have display devices that present color images and videos. A number of factors contribute to accurately reproducing a particular color in the images and videos. Imperfect manufacturing process can lead to less than ideal display devices. Complex underlying physical mechanisms of the display device can degrade during the display's lifetime, leading to less than ideal display performance. Ambient lighting conditions vary in color and luminance, which causes rendering of images and video presented at the display device to appear inaccurate and to not have a subjectively preferred appearance for the person viewing the display device. White balance is the process of adjusting the presented colors so that objects which appear white in person are rendered white. White balance may also be intentionally shifted from a neutral point to create a color cast to the presented image or video (i.e., an unwanted color shift in the whole image caused by reflected light from a nearby object. The display white balance affects display image quality and video quality. Evidence shows that display white balance has a positive correlation to visual experience. Electronic devices to varying degrees may automate certain automatic white balance algorithms to adjust the white balance for changing conditions. However, users have preferred color tones, which are not the same as the ambient light correlated color temperature (CCT) that is used in known automated white balance adjustment algorithms.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

According to a first aspect of the present disclosure, an electronic device, a method, and a computer program product improve the perceived display color and luminance, taking into consideration the ambient light and user preference. In particular, the present disclosure enables an enhanced user experience by adjusting a white balance of a display device according to user preferences in combination with automatically adjusting luminance and chromaticity in response to ambient light conditions. Examples of automatic adjustments are referred to herein as solutions 1-4. The electronic device includes a color-sensitive ambient light sensor (ALS) and the display device. A controller of the electronic device measures luminance and chromaticity of ambient light using the ALS. The controller adjusts display brightness of the display device in relation to intensity of the luminance of the ambient light. The controller automatically determines a display target white balance correlated color temperature (CCT) in relation to the chromaticity of the ambient light. The controller adjusts the display target white balance CCT in relation to user preferences ("user selection (s) related to white balance"). The controller sets the display device to digitally map colors about a neutral color defined by the display target white balance based on the display target white balance CCT.

In one or more embodiments, the electronic device provides a real-time, automatic display white balance (WB) system that is able to produce a real-time WB experience with ambient lightings on still images and videos. In addition, display luminance and chromaticity can be set differently due to user preference, display content, and viewing conditions. The present disclosure provides various automatic display WB solutions which takes into consideration user preference, and which includes measuring the ambient CCT with a color-sensitive ALS.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

Figure 1:
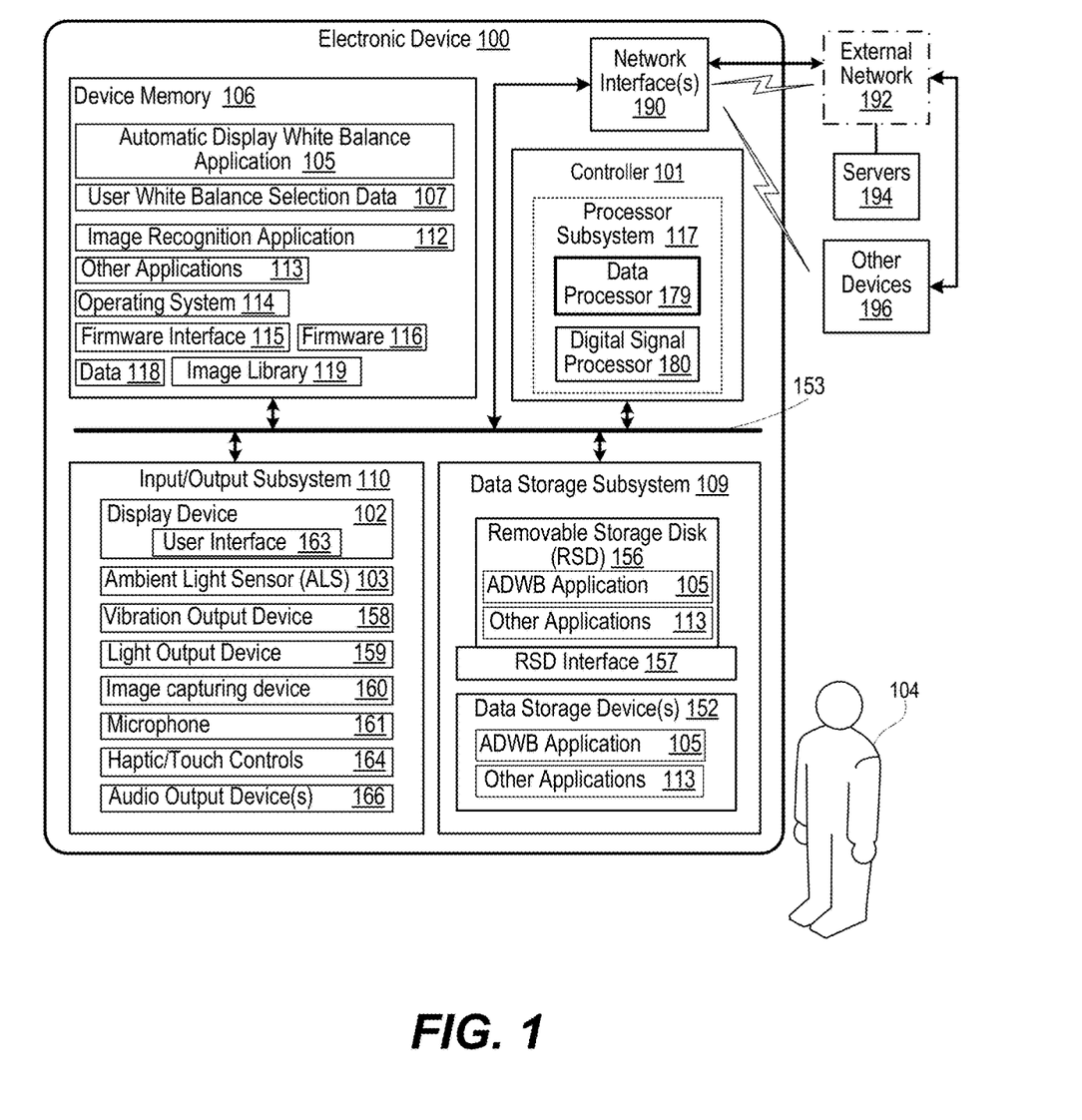
FIG. 1 depicts a functional block diagram of an electronic device having a display device and which is responsive to ambient light conditions and user preferences to adjust a white balance of the display device, and within which the features of the present disclosure are advantageously implemented, according to one or more embodiments.

FIG. 1 is a functional block diagram of an electronic device in an operating environment within which the features of the present disclosure are advantageously implemented. In particular, electronic device 100 is an example of an electronic device that enables an enhanced user experience by automatically adjusting a white balance of display device 102, in part to respond to user preferences. Electronic device 100 can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless communication functionality.

Figure 2:
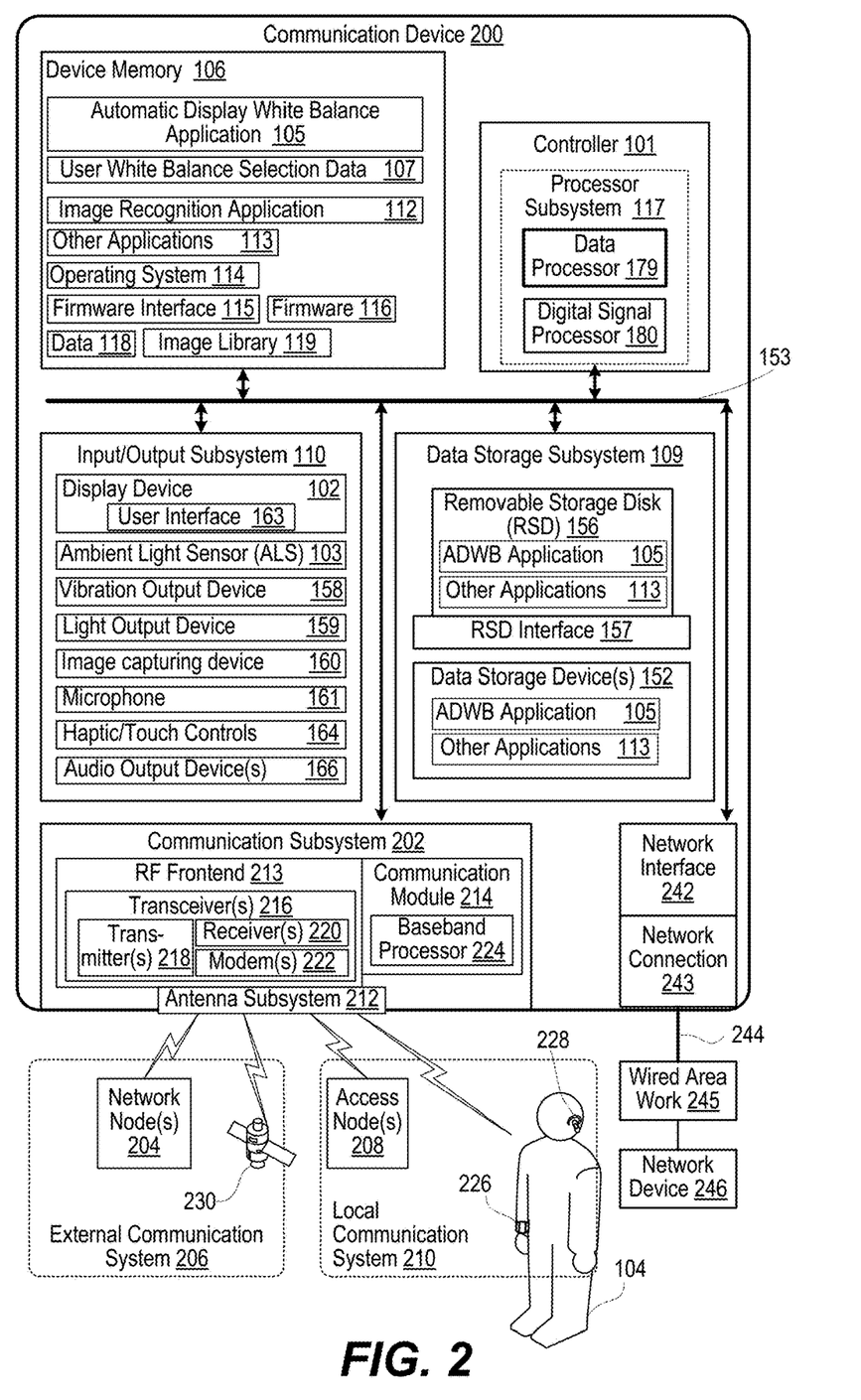
FIG. 2 is a functional block diagram of a communication device in an operating environment within which the features of the present disclosure are advantageously implemented, according to one or more embodiments.

As more completed presented within communication device 200 of FIG. 2, described hereafter, electronic device 100 can also be a device supporting wireless communication. In these implementations, electronic device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. Most importantly, it is appreciated that the features described herein can be implemented with a display device of various other types of electronic devices that are not necessarily a communication device. The specific presentation or description herein of a mobile communication device in addition to a data processing system as different examples of electronic device 100 are for example only, and not intended to be limiting on the disclosure.

Electronic device 100 is managed by controller 101 and includes ambient light sensor (ALS) 103, which is color-sensitive. In one or more embodiments, ALS 103 is a red-green-blue (RGB) sensor that detects three colors. In one or more embodiments, ALS 103 is a hyper-spectral that detects "n" colors, where n is more than 3 colors, such as 10, 100 or more colors.

Person 104 viewing images or videos presented at display device 102 experiences the color image or video differently because of the ambient light conditions. Ambient light affects the eyes of the person 104. When the luminance is low, the cones in the retina of the eyes that are sensitive to color are less effective. Ambient light also reflects back from display device 102, changing the colors perceived by person 104. According to one aspect of the disclosure, controller 101 executes automatic display white balance (ADWB) application 105, which is stored in device memory 106, to measure luminance and chromaticity of ambient light using ALS 103 and to adjust display brightness of display device 102 in relation to intensity of the luminance of the ambient light. Controller 101 automatically determines a display target white balance CCT in relation to the chromaticity of the ambient light. Controller 101 determines a display target white balance CCT that is adjusted in relation to user white balance selection data 107. User white balance selection data 107 includes at least one user selection related to white balance. User white balance selection data 107 is related to white balance and is provided by a user of electronic device 100 and stored in device memory 106 of electronic device 100. Controller 101 sets display device 102 to digitally map colors about a neutral color defined by the display target white balance to enhance experience of person 104.

Referring now to the specific component makeup and the associated functionality of the presented components. In one or more embodiments, electronic device 100 includes device memory 106 data storage subsystem 109, input/output (I/O) subsystem 110, and network interface 190, each of which is managed by controller 101. Device memory 106 includes program code for applications, such as ADWB application 105, image recognition application 112, and other application(s) 113. Device memory 106 further includes operating system (OS) 114, firmware interface 115, such as basic input/output system (BIOS) or Uniform Extensible Firmware Interface (UEFI), and firmware 116.

Controller 101 includes processor subsystem 117, which executes program code to provide operating functionality of electronic device 100. The software and/or firmware modules have varying functionality when their corresponding program code is executed by processor subsystem 117 or secondary processing devices within electronic device 100. Processor subsystem 117 of controller 101 can execute program code of ADWB application 105 and other application(s) 113 to configure electronic device 100 to perform specific functions. Device memory 106 can include data 118, and in particular user white balance selection data 107 used by the ADWB application 105. ADWB application 105 refers to user white balance selection data 107 when performing the automatic white balancing. Image recognition application 112 can refer to image library 119 to identify a particular object when performing one embodiment of color adjustment. Automatic color adjustments may be defined for particular types of objects that are identified by the image recognition application 112, described herein as "solution 3".

Data storage subsystem 109 of electronic device 100 includes data storage device(s) 152. Controller 101 is communicatively connected, via system interlink 153, to data storage device(s) 152. Data storage subsystem 109 provides applications, program code, and stored data on nonvolatile storage that is accessible by controller 101. For example, data storage subsystem 109 can provide a selection of applications and computer data such as ADWB application 105 and other application(s) 113. These applications can be loaded into device memory 106 for execution by controller 101. In one or more embodiments, data storage device(s) 152 can include hard disk drives (HDDs), optical disk drives, and/or solid-state drives (SSDs), etc. Data storage subsystem 109 of electronic device 100 can include removable storage device(s) (RSD(s)) 156, which is received in RSD interface 157. Controller 101 is communicatively connected to RSD 156, via system interlink 153 and RSD interface 157. In one or more embodiments, RSD 156 is a non-transitory computer program product or computer readable storage device. Controller 101 can access RSD 156 or data storage device(s) 152 to provision electronic device 100 with program code, such as code for ADWB application 105 and other application(s) 113.

I/O subsystem 110 includes user interface components such as vibration output device 158, light output device 159, image capturing device(s) 160, microphone 161, display device 102 that presents user interface 163, touch/haptic controls 164, and audio output device(s) 166. Display device 102 is communicatively coupled to controller 101 and presents a user interface and/or operates as a user interface device.

Controller 101 manages, and in some instances directly controls, the various functions and/or operations of electronic device 100. These functions and/or operations include, but are not limited to including, application data processing, communication with second communication devices, navigation tasks, image processing, and signal processing. In one or more alternate embodiments, electronic device 100 may use hardware component equivalents for application data processing and signal processing. For example, electronic device 100 may use special purpose hardware, dedicated processors, general purpose computers, microprocessor-based computers, micro-controllers, optical computers, analog computers, dedicated processors and/or dedicated hard-wired logic.

Controller 101 includes processor subsystem 117, which includes one or more central processing units (CPUs), depicted as data processor 179. Processor subsystem 117 can include one or more digital signal processors 180 that are integrated with data processor 179. Processor subsystem 117 can include other processors that are communicatively coupled internally or externally to data processor 179. Data processor 179 is communicatively coupled, via system interlink 153, to device memory 106, data storage subsystem 109, and network interface 190. Network interface 190 enables electronic device 100 to connect (via wireless or wired connection) to external network 192 and directly/indirectly to other devices 196. Network 192 provides connection to and can include one or more network servers 194 and can provide connection to other devices 196. Electronic device 100 is thus able to connect with servers 194 and other devices 196 to share and/or download application data that can be utilized to implement features of the disclosure. System interlink 153 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 153 are illustrated in FIG. 1, it is to be understood that more, fewer, or different interconnections may be present in other embodiments.

FIG. 2 is a functional block diagram of communication device 200 in an operating environment within which the features of the present disclosure are advantageously implemented. Communication device 200 is an implementation of electronic device 100 (FIG. 1) that further includes communication subsystem 202 for communicating using a cellular connection with network node(s) 204 of external communication system 206 and for communicating using a wireless connection with access node(s) 208 of local communication system 210. Communication subsystem 202 includes antenna subsystem 212. Communication subsystem 202 includes radio frequency (RF) front end 213 and communication module 214. RF front end 213 includes transceiver(s) 216, which includes transmitter(s) 218 and receiver(s) 220. RF front end 213 further includes modem(s) 222. Communication module 214 of communication subsystem 202 includes baseband processor 224 that communicates with controller 101 and RF front end 213. Baseband processor 224 operates in a baseband frequency range to encode data for transmission and decode received data, according to a communication protocol. Modem(s) 222 modulate baseband encoded data from communication module 214 onto a carrier signal to provide a transmit signal that is amplified by transmitter(s) 218. Modem(s) 222 demodulates each signal received from external communication subsystem 202 using by antenna subsystem 212. The received signal is amplified and filtered by receiver(s) 220, which demodulate received encoded data from a received carrier signal.

In one or more embodiments, controller 101, via communication subsystem 202, performs multiple types of cellular OTA or wireless communication with local communication system 210. Communication subsystem 202 can communicate via Bluetooth connection with one or more personal access network (PAN) devices, such as smart watch 226 and wireless headset 228. Communication via Bluetooth connection includes both transmission and reception via a Bluetooth transceiver device. In one or more embodiments, communication subsystem 202 communicates with one or more locally networked devices via a wireless local area network (WLAN) link provided by access node(s) 208. In one or more embodiments, access node(s) 208 supports communication using one or more IEEE 802.11 WLAN protocols. Access node(s) 208 is connected to a wide area network such as the Internet. In one or more embodiments, communication subsystem 202 communicates with GPS satellites 230 to obtain geospatial location information.

In one or more embodiments, communication device 200 includes network interface controller (NIC or "network interface") 242 with a network connection (NC) 243. Network interface 242 can be synonymous with and perform similar functions as network interface 190 (FIG. 1) in some implementations. Network cable 244 connects NC 243 to wired area network 245. NIC 242 can be referred to as a "network interface" that can support one or more network communication protocols. Wired area network 245 can be a local area network (LAN), a campus area network (CAN), a metropolitan area network (MAN), or a wide area network (WAN). For example, NC 243 can be an Ethernet connection. Network device 246 is communicatively coupled to wired area network 245.

Figure 3:
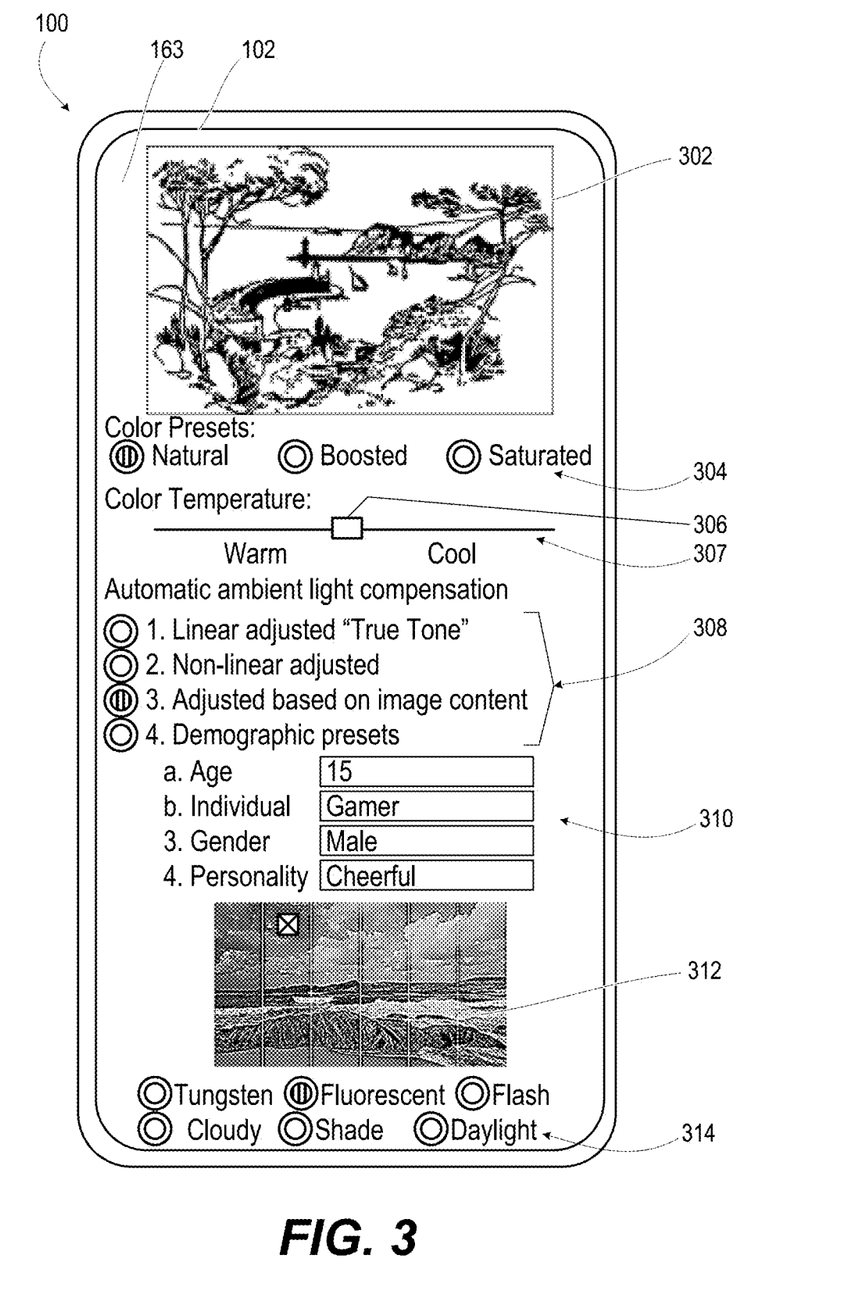
FIG. 3 depicts a display device the communication device that presents a user interface within which user selections for color preferences are received, according to one or more embodiments.

FIG. 3 depicts display device 102 of electronic device 100 that presents user interface 163 by which user selections for color preferences can be received. User interface 163 presents image 302, which includes visual representations of the effects of user selections for color preferences. As an example, the user can select one of three color presets radio buttons 304 associated with "Natural", "Boosted", and "Saturated" effects. As another example, color temperature slider 306 may be positioned along temperature line 307 extending between warm colors and cool colors. In an additional example, automatic ambient light compensation radio buttons 308 may be selected for linear adjusted "true tone", non-linear adjusted, adjusted based on image content, and demographic presets.

In the described embodiments, the linear relationship is referred to as "solution 1", which may be preferred as a true tone option for an electronic reader, presenting an easy-to-read paper-like illumination for normal illumination levels such as indoors. The non-linear relationship is referred to as "solution 2" and may be utilized for an electronic reader for outdoor lighting that vary from low to high illumination levels or other conditions that pursue an aesthetically pleasing color. In an example, a color cast of the image may be automatically adjusted to match an automatically determined lighting temperature of the content of the image or video. Landscape scenes that appear to be taken under a cloudy sky may have the color temperature adjusted to the color associated with cloudiness. Landscape scenes that appear to be taken under a bright sun may have the color temperature adjusted to the color associated with daylight. Indoor scenes with low illumination device presented such as a candle may have the color temperature adjusted to the color associated with candlelight. Alternatively, or as an additional adjustment provided as "solution 3", particular colors and/or the white balance may be accentuated or diminished for predefined cultural or individual associations of content of presented images or video. In an example for solution 3, images recognized as pepperoni pizza may have particular shades of red boosted. In another example, an uncloudy portion of the sky in a landscape scene may be boosted to have a vibrant hue of blue. More than one color of particular objects may be boosted or reduced. Solution 3 may be preferred for colorful pictures, video, and games. In a further example, the demographic preset is referred to as "solution 4". Demographic category entry fields 310 allow entry of age, individual characterization, gender, and personality. Individual characterization may include job categories, hobby categories, ethnic affiliations, etc., that have a correlation as a group to particular preferences in white balancing. To further assist in selecting a unique color temperature, multiple color temperature image 312 includes more than one version of unique color temperature samples to enable comparison of unique color temperature preset options for selecting one of color temperature radio buttons 314: "tungsten", "fluorescent", "flash", "cloudy", "shade" and "daylight". It is appreciated that different lists of color temperature presets can be provided in other embodiments, including more options and excluding some of the presented options. The listed preset options are presented solely as one example of the solution 4 embodiment. Solution 4 may be preferred for browsing text-like Internet webpages, using instant messaging application, performing online shopping, booking tickets, GPS navigating, playing music, participating in a video meeting, and making a voice call, etc.

According to one aspect, Controller 101 (FIG. 1), executing ADWB application 105, performs automatic white balancing by first measuring luminance and chromaticity using ALS 103 to obtain an ambient CCT estimation:

$$L = \Sigma_\lambda L_{amb}(\lambda) ALS(\lambda) \Delta(\lambda)$$

$$X = \Sigma_\lambda L_{amb}(\lambda) ALS(\lambda) \bar{x}(\lambda) \Delta(\lambda)$$

$$Y = \Sigma_\lambda L_{amb}(\lambda) ALS(\lambda) \bar{y}(\lambda) \Delta(\lambda)$$

$$Z = \Sigma_\lambda L_{amb}(\lambda) ALS(\lambda) \bar{z}(\lambda) \Delta(\lambda)$$

$$x = \frac{X}{X + Y + Z}$$

$$y = \frac{Y}{X + Y + Z}$$

$$z = \frac{Z}{X + Y + Z}$$

Commission Internationale de l'Eclairage (CIE) color matching functions, $\bar{x}$, $\bar{y}$, $\bar{z}$, that are factors in the equations above are the chromatic response of the standard observer.

Second, controller 101 performs automatic white balancing by adjusting display brightness based on the ambient light intensity. In an example, controller 101 maps luminance to display panel backlight intensity nits, where a nit is a unit of luminance, with 1 nit=1 candela per square meter.

Third, controller 101 performs automatic white balancing by adjusting display chromaticity based on the formula to get the target CCT:

$$n = (x - 0.332)/(0.1858 - y)$$

$$CCT_{ambient} = 449 \times n^3 + 3525 \times n^2 + 6823.3 \times n + 5520.33$$

Fourth, controller 101 applies delta_x, delta_y values to display device 102. In order to conserve computing capacity and to reduce power consumption, controller 101 may determine that the change in white point from a current setting is less than a threshold amount and not continue with making a change to display device 102.

Figure 4:
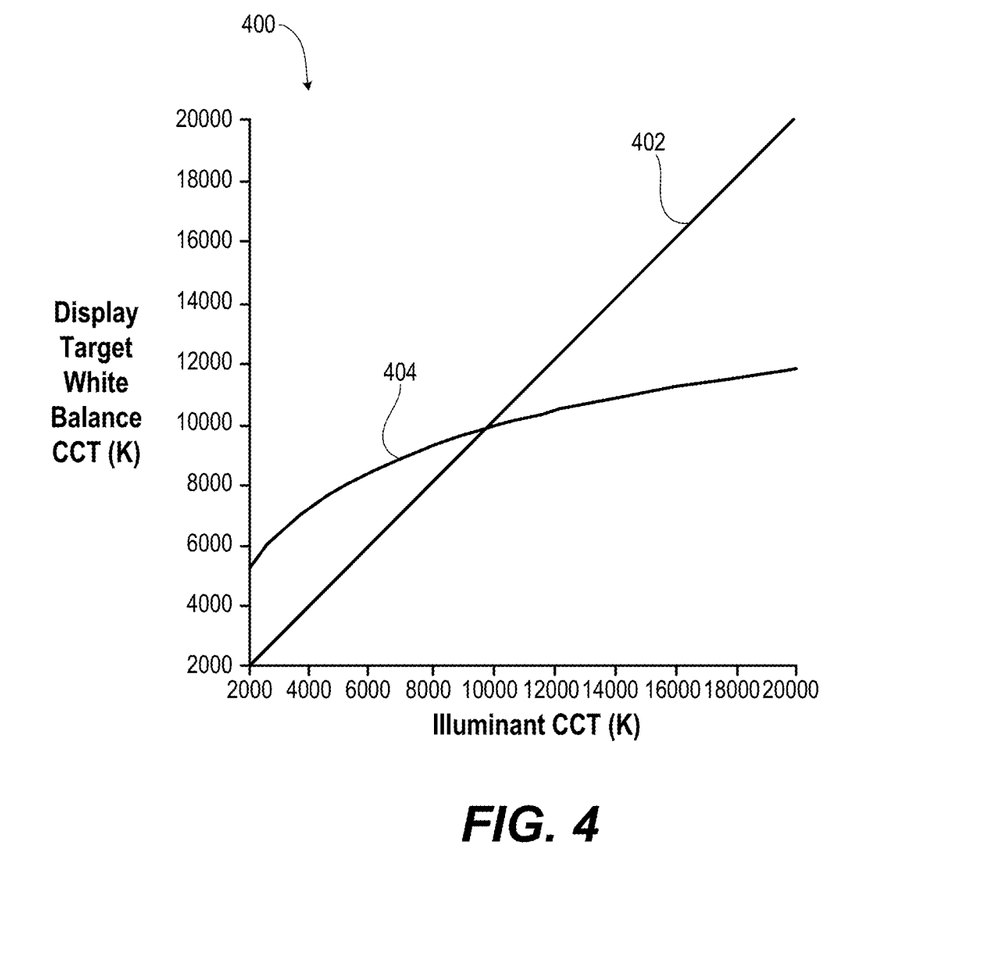
FIG. 4 depicts graphical plots of linear and nonlinear relationships between illuminant correlated color temperature (CCT) and display target white balance CCT, according to one or more embodiments.

FIG. 4 depicts graphical diagram 400 of two plots 402, 404 respectively of linear and nonlinear relationships between illuminant CCT (x-axis) and display target white balance CCT (y-axis). From the illuminant CCT (x-axis value), controller 101 (FIGS. 1-2) may use solution 1 to determine a display white point on plot 402 in a linear relationship that matches the illuminant CCT (x-axis value). Plot 402 has a slope of 1 and intersects the origin. Alternatively, from the illuminant CCT (x-axis value), controller 101 (FIGS. 1-2) may use solution 2 to determine the display white point on plot 404 in a nonlinear relationship that is predefined and stored in memory. The nonlinear relationship is subjectively and empirically predetermined by an original equipment manufacturer (OEM) as having an optimal display color temperature across a range of ambient lighting conditions. The electronic device is provisioned with this nonlinear relationship such as in a lookup table or formula.

Figure 5A:
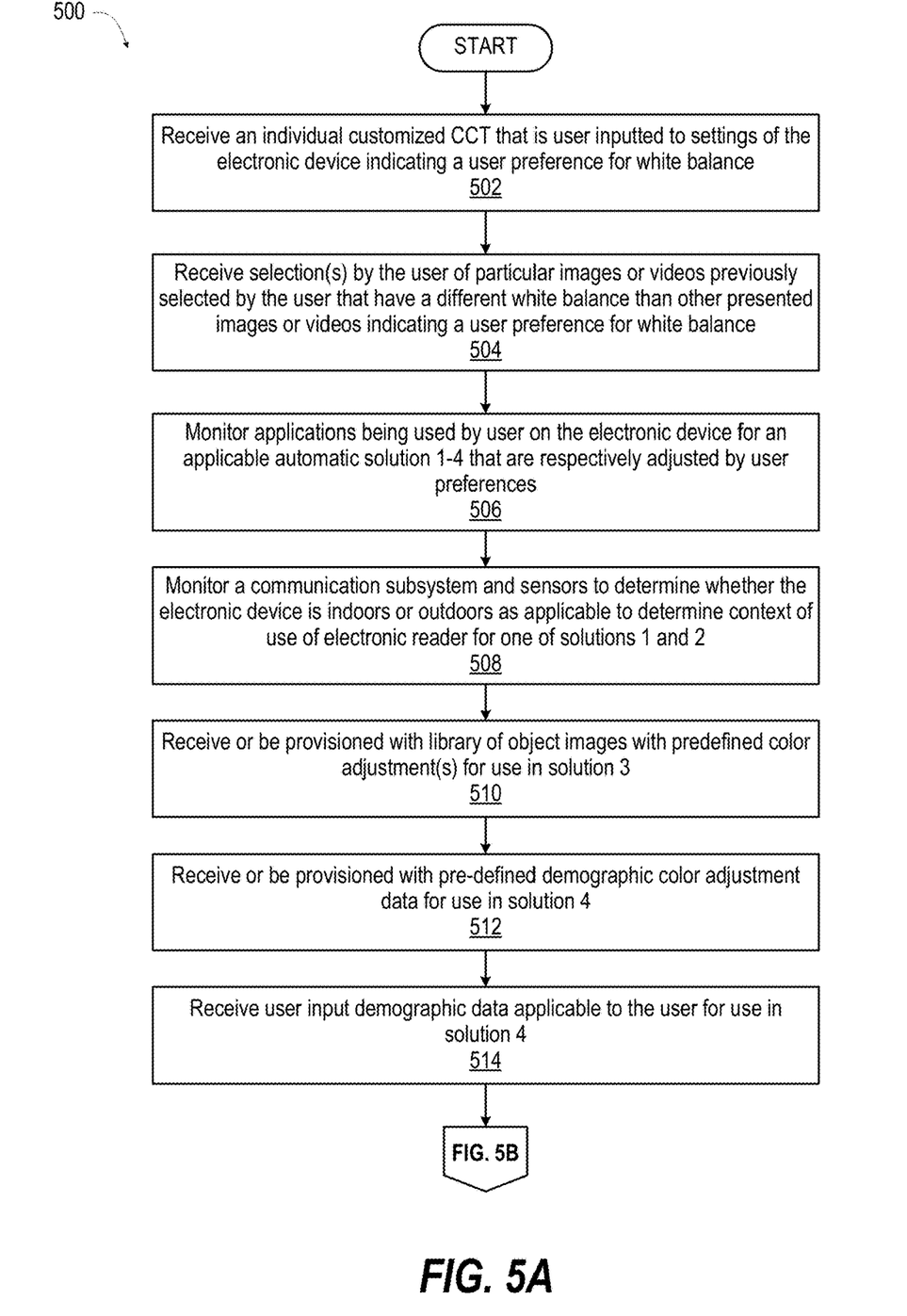
FIGS. 5A-5C (collectively FIG. 5) present a flow diagram of a method by which communication device responds to ambient light conditions according to user preferences to adjust a white balance of a display device, according to one or more embodiments.
Figure 5B:
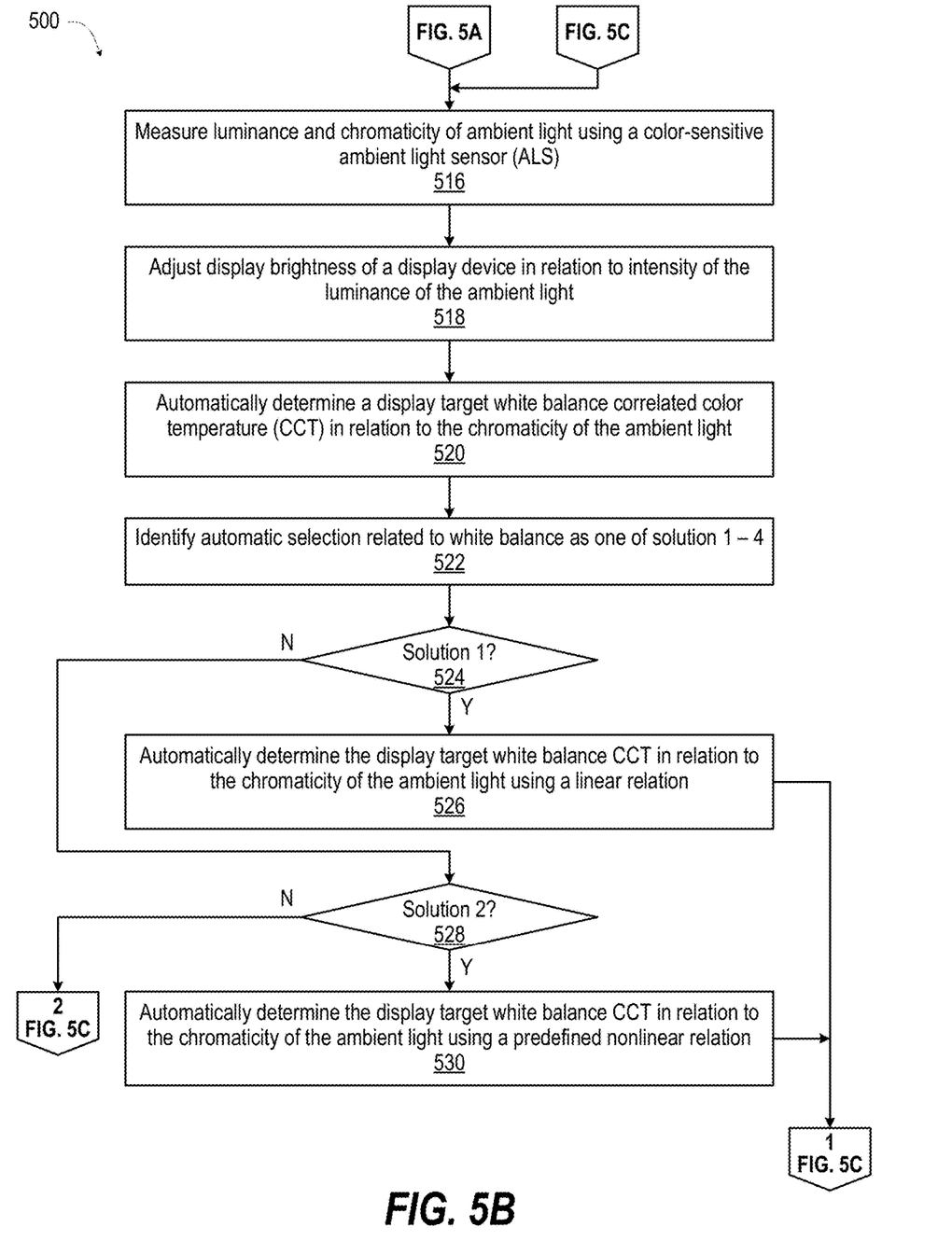
Figure 5C:
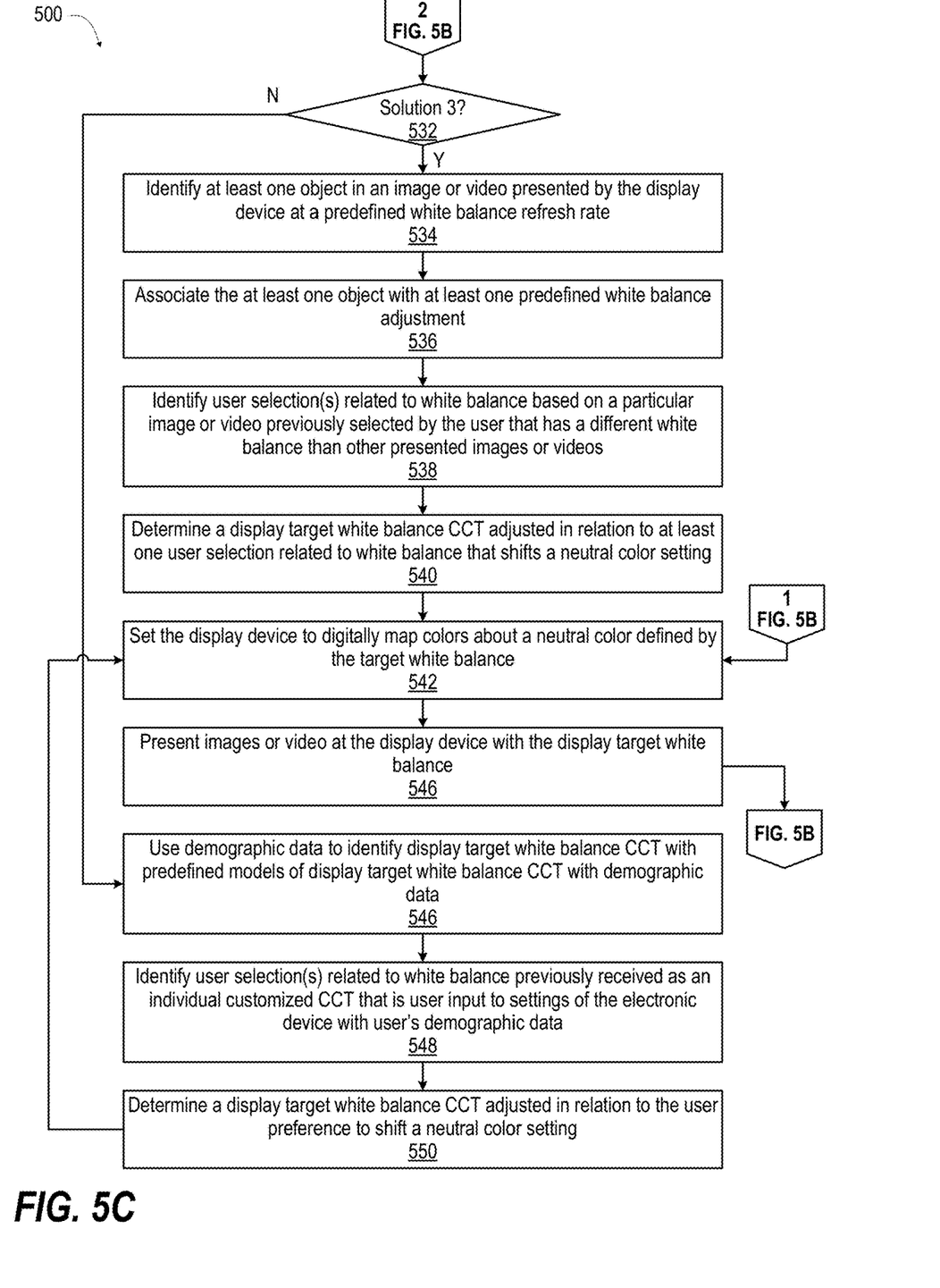

FIGS. 5A-5C (collectively FIG. 5) present a flow diagram of method 500 performed by electronic device 100 for responding to ambient light conditions using user preferences to adjust a white balance of a display device. The descriptions of method 500 is provided with general reference to the specific components illustrated within the preceding FIGS. 1-4, and specific components referenced in method 500 may be identical or similar to components of the same name used in describing preceding FIGS. 1-4. In one or more embodiments, controller 101 configures electronic device 100 (FIG. 1) or communication device (FIG. 2) to provide functionality of method 500. With reference to FIG. 5A, method 500 includes receiving an individual customized CCT that is user inputted to settings of the electronic device indicating a user preference for white balance (block 502). Method 500 includes receiving selection(s) by the user of particular images or videos previously selected by the user that have a different white balance than other presented images or videos indicating a user preference for white balance (block 504). Method 500 includes monitoring applications being used by a user on the electronic device for an applicable automatic solution 1, 2, 3, or 4 that are respectively adjusted by user preferences (block 506). Method 500 includes monitoring a communication subsystem and sensors to determine whether the electronic device is indoors or outdoors as applicable to determine context of use of electronic reader for one of solutions 1 and 2 (block 508). Method 500 includes receiving or being provisioned with library of object images with predefined color adjustment(s) for use in solution 3 (block 510). Method 500 includes receiving or being provisioned with pre-defined demographic color adjustment data for use in solution 4 (block 512). Method 500 includes receiving user input demographic data applicable to the user for use in solution 4 (block 514). Then method 500 proceeds to block 516 (FIG. 5B).

With reference to FIG. 5B, method 500 includes measuring luminance and chromaticity of ambient light using a color-sensitive ambient light sensor (ALS) (block 516). Method 500 includes adjusting display brightness of a display device in relation to intensity of the luminance of the ambient light (block 518). Method 500 includes automatically determining a display target white balance correlated color temperature (CCT) in relation to the chromaticity of the ambient light (block 520). Method 500 includes identifying automatic selection related to white balance as one of solutions 1, 2, 3, or 4 (block 522). In an example, the electronic device determines a current mode of usage and automatically selects a corresponding solution. Using an electronic reader in an indoor setting indicates solution 1. Using the electronic reader in an outdoor setting indicates solution 2. Playing a game or presenting visual media content that is bright and colorful may indicate solution 3. Browsing internet content or using communication applications may indicate solution 4. Method 500 includes determining whether the automatic selection is solution 1 (decision block 524). In response to determining that the automatic selection is solution 1, method 500 includes automatically determine the display target white balance CCT in relation to the chromaticity of the ambient light using a linear relation (block 526). Then, method 500 proceeds to block 542 (FIG. 5C). In response to determining that the automatic selection is not solution 1, method 500 includes determining whether the automatic selection is solution 2 (decision block 528). In response to determining that the automatic selection is solution 2, method 500 includes automatically determining the display target white balance CCT in relation to the chromaticity of the ambient light using a predefined nonlinear relation (block 530). Then method 500 proceeds to block 542 (FIG. 5C).

With reference to FIG. 5C, in response to determining that the automatic selection is not solution 2, method 500 includes determining whether the automatic selection is solution 3 (decision block 532). In response to determining that the automatic selection is not solution 3, method 500 proceeds to block 546. In response to determining that the automatic selection is solution 3, method 500 includes identifying at least one object in an image or video presented by the display device at a predefined white balance refresh rate (block 534). Method 500 includes associating the at least one object with at least one predefined white balance adjustment stored in memory (block 536). Method 500 includes identifying user selection(s) related to white balance based on a particular image or video previously selected by the user that has a different white balance than other presented images or videos (block 538). Method 500 includes determining a display target white balance CCT, which is adjusted in relation to at least one user selection related to white balance and that shifts a neutral color setting (block 540). In an example, one or more defined colors in an image or video are adjusted in luminance and/or chromaticity within a portion of an image that is recognized as the associated object. In another example, a white point is adjusted to impart a color cast to an entire image or video in response to identifying at least one object. Method 500 includes setting the display device to digitally map colors about a neutral color defined by the display target white balance CCT (block 542). Method 500 includes presenting, at the display device, images or video with the display target white balance CCT (block 544). Then, method 500 returns to block 516 (FIG. 5B).

In response to determining that the automatic selection is not solution 3 in decision block 532, solution 4 is identified as the applicable solution, and method 500 includes using demographic data to identify a selected display target white balance CCT as one predefined model of display target white balance CCT that is associated with the demographic data (block 546). In an example, the electronic device is provisioned with the predefined white balance adjustments by the OEM. The electronic device determines which of the predefined white balance adjustments are applicable to the user of the electronic device. Method 500 includes identifying user selection(s) related to white balance previously received as an individual customized CCT that is user inputted to settings of the electronic device with user's demographic data (block 548). Method 500 includes determining a display target white balance CCT adjusted in relation to the user preferences to shift a neutral color setting (block 550). Then method returns to block 542.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
a color-sensitive ambient light sensor (ALS);
a display device;
a memory that stores at least one user selection related to white balance, the at least one user selection comprising a white balance adjustment solution from among linear adjustment, non-linear adjustment, adjustment based on image content, and adjustment based on demographic presets; and
a controller communicatively coupled to the ALS and the memory, and which:
measures luminance and chromaticity of ambient light using the ALS;
adjusts display brightness of the display device in relation to intensity of the luminance of the ambient light;
automatically determines a display target white balance correlated color temperature (CCT) in relation to the chromaticity of the ambient light;
determines a current mode of usage of the electronic device from among four modes each corresponding to a respective automatic display white balance solution, wherein to determine the current mode the controller:
monitors applications being used on the electronic device for an applicable automatic solution that is adjusted by respective user preferences;
monitors a communication subsystem and sensors to determine whether the electronic device is indoors or outdoors as applicable to determine context of use for linear and non-linear adjustments;
receives a library of object images with predefined color adjustment(s) for use in making image content based adjustments; and
receives user input demographic data applicable to the user for use as demographic present adjustment, the demographic data comprising one or more of gender, personality, and individual characterization comprising job categories, hobby categories, and ethnic affiliations that have a correlation to particular preferences in white balancing;
automatically selects a corresponding solution based on the determined current mode of usage;
adjusts the display target white balance CCT in relation to the at least one user selection and corresponding white balance adjustment solution that shifts a neutral color setting;
in response to the user selection of the white balance adjustment solution being the adjustment based on demographic presets, adjusts at least one color of the display target white balance CCT using at least one predefined color adjustment that is associated with at least one demographic category associated with a user of the electronic device; and
sets the display device to digitally map colors about a neutral color defined by a target white balance based on the display target white balance CCT.

2. The electronic device of claim 1, wherein in response to the at least one user selection comprising linear adjustment, the controller further automatically determines the display target white balance CCT in relation to the chromaticity of the ambient light using a linear relation.

3. The electronic device of claim 1, wherein in response to the at least one user selection comprising non-linear adjustment, the controller further automatically determines the display target white balance CCT in relation to the chromaticity of the ambient light using a predefined non-linear relation, wherein a color cast of the image or video is automatically adjusted to match an automatically determined lighting temperature of the content of the image or video.

4. The electronic device of claim 1, wherein, in response to the at least one user selection comprising adjustment based on image content, the controller:
- at a predefined white balance refresh rate, identifies at least one object in a video presented by the display device;
- associates the at least one object with at least one predefined color adjustment; and
- adjusts at least one color of the display target white balance CCT using the at least one predefined color adjustment, wherein one or more of particular colors and the white balance is accentuated or diminished for predefined cultural or individual associations of content of presented video.

5. The electronic device of claim 1, wherein, in response to the at least one user selection comprising adjustment based on image content, the controller:
- identifies at least one object in an image presented by the display device;
- associates the at least one object with at least one predefined color adjustment; and
- adjusts at least one color of the display target white balance CCT using the at least one predefined color adjustment, wherein one or more of particular colors and the white balance is accentuated or diminished for predefined cultural or individual associations of content of presented video.

6. The electronic device of claim 1, wherein, to adjusts at least one color of the display target white balance CCT using at least one predefined color adjustment that is associated with at least one demographic category associated with a user, the controller:
- identifies the at least one demographic category associated with the user of the electronic device from among gender, personality, and individual characterization comprising job categories, hobby categories, and ethnic affiliations that have a correlation to particular preferences in white balancing;
- associates the at least one demographic category with a corresponding at least one predefined color adjustment; and
- adjusts at least one color of the display target white balance CCT using the corresponding at least one predefined color adjustment.

7. The electronic device of claim 1, wherein the controller:
- presents more than one version of an image or video, each version having a unique color temperature; and
- receives a selection of one of the more than one version of an image or video as part of the at least one user selection related to white balance.

8. A method comprising:
- measuring luminance and chromaticity of ambient light using a color-sensitive ambient light sensor (ALS) of an electronic device;
- adjusting display brightness of a display device of the electronic device in relation to intensity of the luminance of the ambient light;
- automatically determining a display target white balance correlated color temperature (CCT) in relation to the chromaticity of the ambient light;
- determining a current mode of usage of the electronic device from among four modes each corresponding to a respective automatic display white balance solution, wherein determining the current mode of usage comprises:
  - monitoring applications being used on the electronic device for an applicable automatic solution that is adjusted by respective user preferences;
  - monitoring a communication subsystem and sensors to determine whether the electronic device is indoors or outdoors as applicable to determine context of use for linear and non-linear adjustments;
  - receiving a library of object images with predefined color adjustment(s) for use in making image content based adjustments; and
  - receiving user input demographic data applicable to the user for use as demographic present adjustment, the demographic data comprising one or more of gender, personality, and individual characterization comprising job categories, hobby categories, and ethnic affiliations that have a correlation to particular preferences in white balancing;
- based on the determined current mode of usage, automatically selecting a corresponding white balance adjustment solution from among linear adjustment, non-linear adjustment, adjustment based on image content, and adjustment based on demographic presets, as identified by at least one user selection;
- adjusting a display target white balance CCT in relation to the at least one user selection and corresponding white balance adjustment solution that shifts a neutral color setting;
- in response to the user selection of the white balance adjustment solution being the adjustment based on demographic presets, adjusting at least one color of the display target white balance CCT using at least one predefined color adjustment that is associated with at least one demographic category associated with a user of the electronic device; and
- setting the display device to digitally map colors about a neutral color defined by the display target white balance based on the display target white balance CCT.

9. The method of claim 8, wherein in response to the at least one user selection comprising linear adjustment, the automatically determining the display target white balance CCT in relation to the chromaticity of the ambient light comprises using a linear relation.

10. The method of claim 8, wherein in response to the at least one user selection comprising non-linear adjustment, the automatically determining the display target white balance CCT in relation to the chromaticity of the ambient light comprises using a predefined nonlinear relation.

11. The method of claim 8, wherein in response to the at least one user selection comprising adjustment based on image content, the method comprises:
- at a predefined white balance refresh rate, identifying at least one object in a video presented by the display device;
- associating the at least one object with at least one predefined color adjustment; and
- adjusting at least one color of the display target white balance CCT using the at least one predefined color adjustment.

12. The method of claim 8, wherein in response to the at least one user selection comprising adjustment based on image content, the method comprises:
- identifying at least one object in an image presented by the display device;
- associating the at least one object with at least one predefined color adjustment; and adjusting at least one color of the display target white balance CCT using the at least one predefined color adjustment.

13. The method of claim 8, wherein adjusting at least one color of the display target white balance CCT using at least one predefined color adjustment that is associated with at least one demographic category associated with a user, comprises:
identifying the at least one demographic category associated with the user of the electronic device;
associating the at least one demographic category with a corresponding at least one predefined color adjustment; and
adjusting at least one color of the display target white balance CCT using the corresponding at least one predefined color adjustment.

14. The method of claim 8, further comprising:
presenting more than one version of an image or video, each version having a unique color temperature; and
receiving a selection of one of the more than one version of an image or video as part of the at least one user selection related to white balance.

15. A computer program product comprising:
a non-transitory computer readable storage device; and
program code on the non-transitory computer readable storage device that when executed by a processor associated with an electronic device, the program code enables the electronic device to provide functionality of:
measuring luminance and chromaticity of ambient light using a color-sensitive ambient light sensor (ALS);
adjusting display brightness of a display device in relation to intensity of the luminance of the ambient light;
automatically determining a display target white balance correlated color temperature (CCT) in relation to the chromaticity of the ambient light;
determining a current mode of usage of the electronic device from among four modes each corresponding to a respective automatic display white balance solution, wherein determining the current mode of usage comprises:
monitoring applications being used on the electronic device for an applicable automatic solution that is adjusted by respective user preferences;
monitoring a communication subsystem and sensors to determine whether the electronic device is indoors or outdoors as applicable to determine context of use for linear and non-linear adjustments;
receiving a library of object images with predefined color adjustment(s) for use in making image content based adjustments; and
receiving user input demographic data applicable to the user for use as demographic present adjustment, the demographic data comprising one or more of gender, personality, and individual characterization comprising job categories, hobby categories, and ethnic affiliations that have a correlation to particular preferences in white balancing;
based on the determined current mode of usage, automatically selecting a corresponding white balance adjustment solution from among linear adjustment, non-linear adjustment, adjustment based on image content, and adjustment based on demographic presets, as identified by at least one user selection;
adjusting a display target white balance CCT in relation to the at least one user selection and corresponding white balance adjustment solution that shifts a neutral color setting;
in response to the user selection of the white balance adjustment solution being the adjustment based on demographic presets, adjusting at least one color of the display target white balance CCT using at least one predefined color adjustment that is associated with at least one demographic category associated with a user of the electronic device; and
setting the display device to digitally map colors about a neutral color defined by the display target white balance based on the display target white balance CCT.

16. The computer program product of claim 15, wherein the program code enables the electronic device to provide the functionality of:
monitoring a communication subsystem and sensors of the electronic device to determine whether the electronic device is indoors or outdoors as applicable to determine context of use for performing linear or non-linear adjustments;
automatically determining the display target white balance CCT in relation to the chromaticity of the ambient light using a determined one of a linear adjustment and a predefined nonlinear adjustment identified by the context of use.

17. The computer program product of claim 15, wherein the program code enables the electronic device to provide the functionality of in response to the at least one user selection comprising adjustment based on image content:
identifying at least one object in an image or video presented by the display device;
associating the at least one object with at least one predefined color adjustment; and
adjusting at least one color of the display target white balance CCT using the at least one predefined color adjustment.

* * * * *